US010004057B2

(12) United States Patent
Chae

(10) Patent No.: US 10,004,057 B2
(45) Date of Patent: Jun. 19, 2018

(54) METHOD FOR PERFORMING OTDOA-RELATED OPERATION IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/507,223

(22) PCT Filed: Aug. 31, 2015

(86) PCT No.: PCT/KR2015/009149
§ 371 (c)(1),
(2) Date: Feb. 27, 2017

(87) PCT Pub. No.: WO2016/032308
PCT Pub. Date: Mar. 3, 2016

(65) Prior Publication Data
US 2017/0289953 A1 Oct. 5, 2017

Related U.S. Application Data

(60) Provisional application No. 62/043,424, filed on Aug. 29, 2014.

(51) Int. Cl.
*H04W 64/00* (2009.01)
*G01S 1/02* (2010.01)
(52) U.S. Cl.
CPC ............ *H04W 64/006* (2013.01); *G01S 1/02* (2013.01)

(58) Field of Classification Search
CPC ... H04W 24/02; H04W 72/082; H04W 24/10; H04W 52/243; H04W 52/244; H04W 16/14; H04W 72/1215; H04J 11/005; H04L 5/0073
See application file for complete search history.

(56) References Cited

U.S. PATENT DOCUMENTS

| 2011/0105144 | A1 | 5/2011 | Siomina et al. |
| 2012/0027110 | A1 | 2/2012 | Han et al. |
| 2013/0122930 | A1 | 5/2013 | Woo et al. |
| 2013/0237247 | A1 | 9/2013 | Lee et al. |
| 2014/0176366 | A1 | 6/2014 | Fischer et al. |

OTHER PUBLICATIONS

PCT International Application No. PCT/KR2015/009149, Written Opinion of the International Searching Authority dated Nov. 27, 2015, 23 pages.

*Primary Examiner* — Nizar Sivji
(74) *Attorney, Agent, or Firm* — Lee Hong Degerman Kang Waimey

(57) ABSTRACT

One embodiment of the present invention relates to a method for performing, by a base station, observed time difference of arrival (OTDOA)-related operations in a wireless communication system, the method comprising the steps of: transmitting a positioning reference signal (PRS) to a terminal through a PRS positioning occasion to which at least two precoding processes are applied; receiving, from the terminal, OTDOA signal measurement information on the basis of the PRS; and positioning the terminal on the basis of the OTDOA signal measurement information.

13 Claims, 8 Drawing Sheets

METHOD FOR PERFORMING OTDOA-RELATED OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2015/009149, filed on Aug. 31, 2015, which claims the benefit of U.S. Provisional Application No. 62/043,424, filed on Aug. 29, 2014, the contents of which are all hereby incorporated by reference herein in their entirety.

TECHNICAL FIELD

The present invention relates to a wireless communication system, and more particularly, to methods and apparatus for performing OTDOA-related operation at a base station and a user equipment.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Task

The technical task of the present invention is to provide a method for transmitting and measuring a reference signal, which can improve position estimation accuracy.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first technical aspect of the present invention, provided is a method of performing operation related to observed time difference of arrival (OTDOA) in a wireless communication system, the method performed by a base station and including: transmitting, to a user equipment, a positioning reference signal (PRS) through a PRS positioning occasion to which at least two precodings are applied; receiving, from the user equipment, OTDOA signal measurement information based on the PRS; and determining a position of the user equipment based on the OTDOA signal measurement information.

In a second technical aspect of the present invention, provided is a method of performing operation related to observed time difference of arrival (OTDOA) in a wireless communication system, the method performed by a user equipment and including: receiving a positioning reference signal (PRS) on a PRS positioning occasion to which at least two precodings are applied PRS; and transmitting, to a base station, OTDOA signal measurement information based on the PRS.

Some or all of the following items may be included in the first and second technical aspects of the present invention.

The OTDOA signal measurement information may include only a measurement value associated with a precoding with a high measurement quality among the at least two precodings.

The OTDOA signal measurement information may include a reference signal time difference (RSTD) measurement associated with a precoding with a high measurement quality.

Each of the at least two precodings may form different vertical beams for the user equipment.

The PRS positioning occasion may include two or more consecutive subframes and one of the at least two precodings may be applied to each of the two or more consecutive subframes.

An average of measurement results in subframes where different precodings among the at least two precodings are applied may not be allowed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
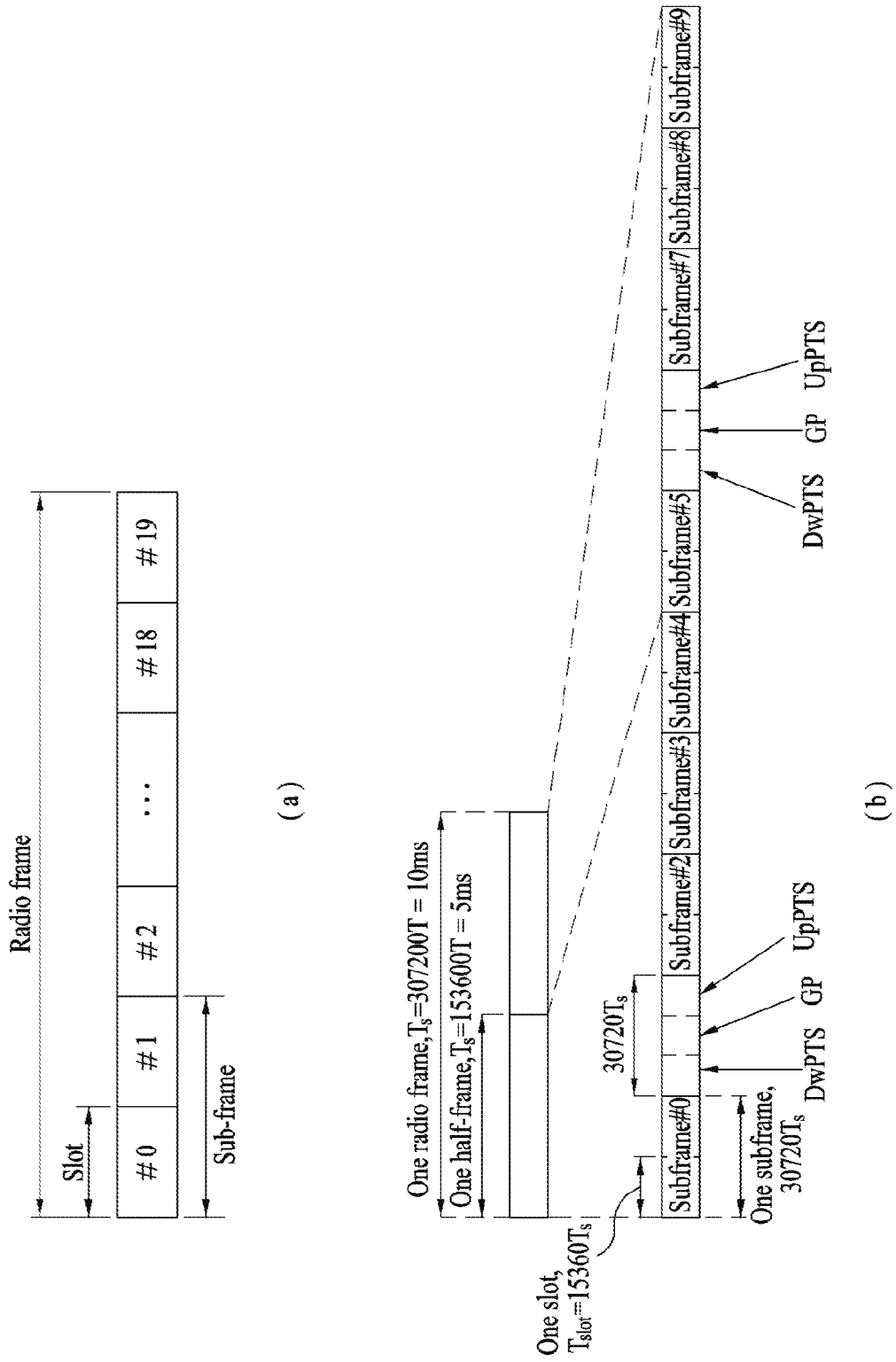
FIG. 1 is a diagram illustrating a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

In the following description, the term "cell" may be interpreted as a transmission/reception point such as a base station (or eNB), a sector, a remote radio head (RRH), a relay, etc. In addition, it may be used as a comprehensive term referring to any object capable of identifying a component carrier (CC) at a specific transmission/reception point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
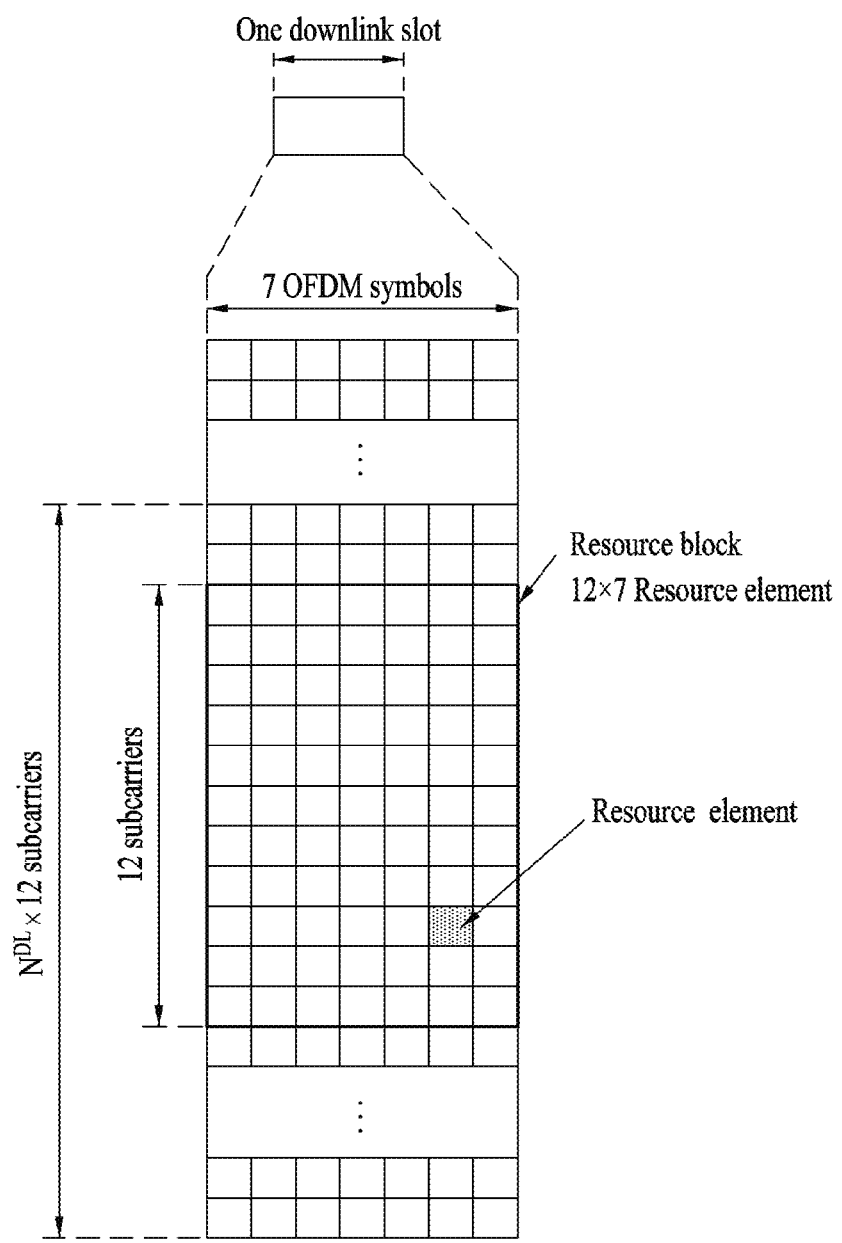
FIG. 2 is a diagram illustrating a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
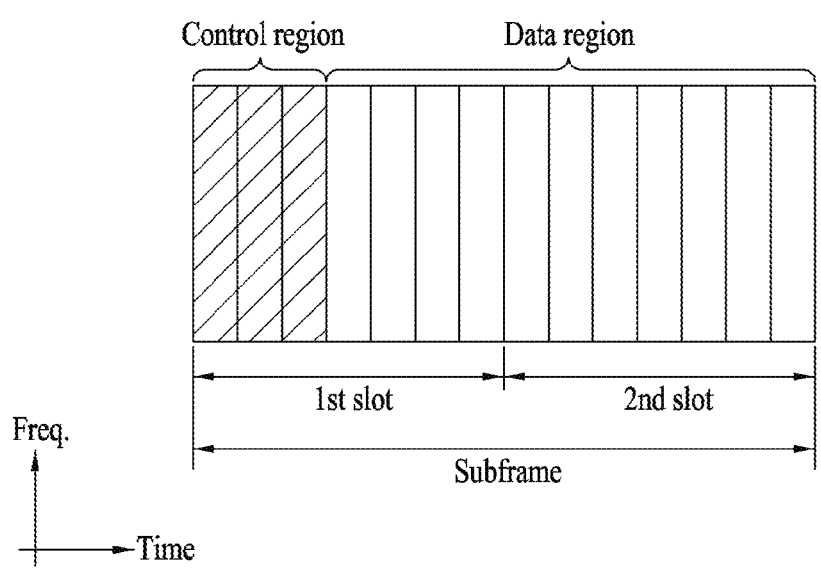
FIG. 3 is a diagram illustrating a downlink subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. The CCE corresponds to a plurality of RE groups. The number of CCEs necessary for the PDCCH may be changed depending on a size, a coding rate and the like of the DCI. For instance, one of 1, 2, 4 and 8 CCEs (corresponding to PDCCH formats 0, 1, 2, and 3, respectively) can be used for PDCCH transmission. If a DCI size is large and/or if a low coding rate is required due to a poor channel state, a relatively large number of CCEs may be used to transmit a single PDCCH. A BS determines a PDCCH format in consideration of a size of DCI transmitted to a UE, a cell bandwidth, the number of downlink antenna ports, the amount of PHICH resources, etc. and adds CRC (cyclic redundancy check) to control information. The CRC is masked by an Identifier (ID) known as a radio network temporary identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is associated with system information (particularly, a system information block (SIB)), the CRC may be masked by a system information ID and a system information RNTI (SI-RNTI). To indicate that the PDCCH carries a random access response in response to a random access preamble transmitted by a UE, the CRC may be masked by a random access-RNTI (RA-RNTI).

Figure 4:
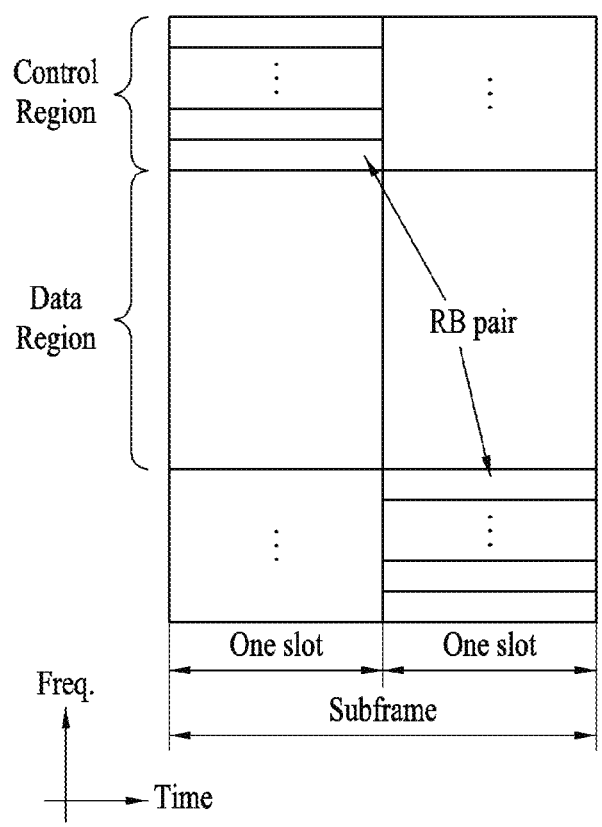
FIG. 4 is a diagram illustrating an uplink subframe structure.
Figure 5:
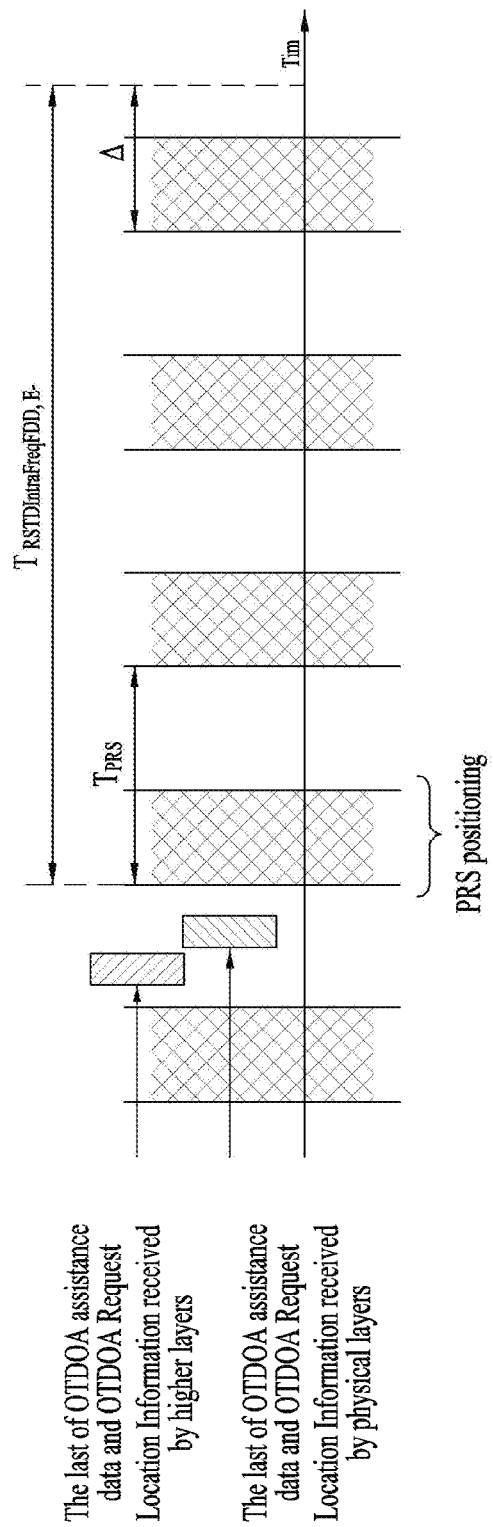
FIG. 5 is a diagram for explaining OTDOA.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary Reference Signal (RS)

Since a packet is transmitted on a radio channel in a wireless communication system, a signal may be distorted in the course of transmission. A receiving end needs to correct the distorted signal using channel information to receive a correct signal. To enable the receiving end to obtain the channel information, a transmitting end transmits a signal known to both a transmitting end and the receiving end. Thereafter, the receiving end can obtain the channel information based on the degree of distortion occurring when the signal is received on the radio channel. Such a signal is called a pilot signal or a reference signal.

When data is transmitted and received through multiple antennas, the receiving ends needs to be aware of a channel state between each transmit antenna and each receive antenna to receive the data correctively. Accordingly, a separate reference signal needs to exist for each transmitting antenna, more particularly, for each antenna port.

A reference signal may be divided into an uplink reference signal and a downlink reference signal. According to the current LTE system, the uplink reference signal may include:

i) a demodulation reference signal (DM-RS) for channel estimation to coherently demodulate information transmitted through a PUSCH and a PUCCH; and ii) a sounding reference signal (SRS) for enabling a BS to measure an uplink channel quality of a frequency band at a different network.

On the other hand, the downlink reference signal may include:

i) a cell-specific reference signal (CRS) shared by all UEs within a cell;

ii) a UE-specific reference signal configured for only a specific UE;

iii) a demodulation reference signal (DM-RS) transmitted for coherent demodulation when a PDSCH is transmitted;

iv) a channel state information-reference signal (CSI-RS) for transmitting channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate a geographic position information of a UE.

Reference signals are mainly classified into two types according to the purposes thereof: a reference signal for channel information acquisition and a reference signal for data demodulation. Since the former reference signal is used to allow a UE to acquire downlink channel information, it should be transmitted over a wideband. In addition, even a UE which does not receive downlink data in a specific subframe should receive the corresponding reference signal. In addition, this reference signal can also be used in case of handover. The latter reference signal is transmitted through resources used when a BS transmits downlink data. By receiving this reference signal, a UE may perform a channel measurement and then demodulate data. Such a reference signal should be transmitted in a region in which data is transmitted.

Position Information of UE

In general, various methods has been used in a cellular communication system to allow a network to obtain position information of a UE. In the LTE system, a UE receives configuration information associated with positioning reference signal (PRS) transmission from a BS through a higher layer signal and measures PRSs transmitted from cells adjacent to the UE. Thereafter, the UE calculates information on its position based on a positioning scheme such as OTDOA (observed time difference of arrival) and then transmits the calculated information to the network. In addition, there are other positioning schemes such as an A-GNSS (assisted global navigation satellite system) positioning scheme, an E-CID (enhanced cell-ID) technique, and UTDOA (uplink time difference of arrival). Such positioning schemes can be utilized for various location-based services (e.g., advertisement, position tracking, emergency communication means, and the like).

OTDOA (Observed Time Difference of Arrival)

According to the OTDOA, a UE is provided with information on a reference cell and information on neighbor cells. Thereafter, the UE measures a relative time difference between the reference cell and the neighbor cells using a specific signal (e.g., PRS) and then reports the relative time difference. Based on the relative time difference, a position of the corresponding UE is determined.

Hereinafter, intra-frequency OTDOA measurement in FDD will be described.

When physical cell IDs of neighbor cell are provided together with OTDOA assistance data, a UE may detect and measure an intra-frequency RSTD within a total time reserved for detection and measurement. The total time for detection and measurement is given as shown in Equation 1.

Equation 1

$$T_{RSTD\ IntraFreqFDD,\ E\text{-}UTRAN} = T_{PRS} \cdot (M-1) + \Delta\ ms \quad \text{[Equation 1]}$$

In Equation 1, $T_{RSTD\ IntraFreqFDD,\ E\text{-}UTRAN}$ is the total time for detection and measurement at least n cells, $T_{PRS}$ is a cell-specific positioning subframe configuration period, and M is the number of PRS positioning occasions, where each of the PRS positioning occasions is composed of $N_{PRS}$ (where, $1 \le N_{PRS} \le 6$) consecutive downlink positioning subframes. This can be summarized as shown in Table 1 below.

TABLE 1

| Positioning subframe configuration period $T_{PRS}$ | Number of PRS positioning occasions M | |
|---|---|---|
| | f1 | f1 and f2 |
| 160 ms | 16 | 32 |
| >160 ms | 8 | 16 |

When only intra-frequency RSTD measurements are performed over cells belonging to the serving FDD carrier frequency f1.
When intra-frequency RSTD and inter-frequency RSTD measurements are performed over cells belonging to the serving FDD carrier frequency f1 and one inter-frequency carrier frequency f2, respectively.

In addition, $$\Delta = 160 \cdot \left\lceil \frac{n}{M} \right\rceil_{ms}$$

is a measurement time for a single PRS positioning occasion, i.e., $N_{PRS}$ ($1 \le N_{PRS} \le 6$), which includes a sampling time and a processing time.

A UE physical layer may be capable of reporting RSTDs for the reference cell and all neighbor cells i, which are out of at least (n−1) neighbor cells, within $T_{RSTD\ IntraFreqFDD,\ E\text{-}UTRAN}$. In addition, it satisfies the condition of (PRS $\hat{E}_s$/Iot)$_{ref} \ge -6$ dB for all frequency bands for the reference cell and the condition of PRS$\hat{E}_s$/Iot)$_i \ge -13$ dB for all frequency bands for the neighbour cell i, where PRS $\hat{E}_s$/Iot is a ratio of average received energy per PRS RE and the ratio is measured over all REs that carry PRSs.

Figure 6:
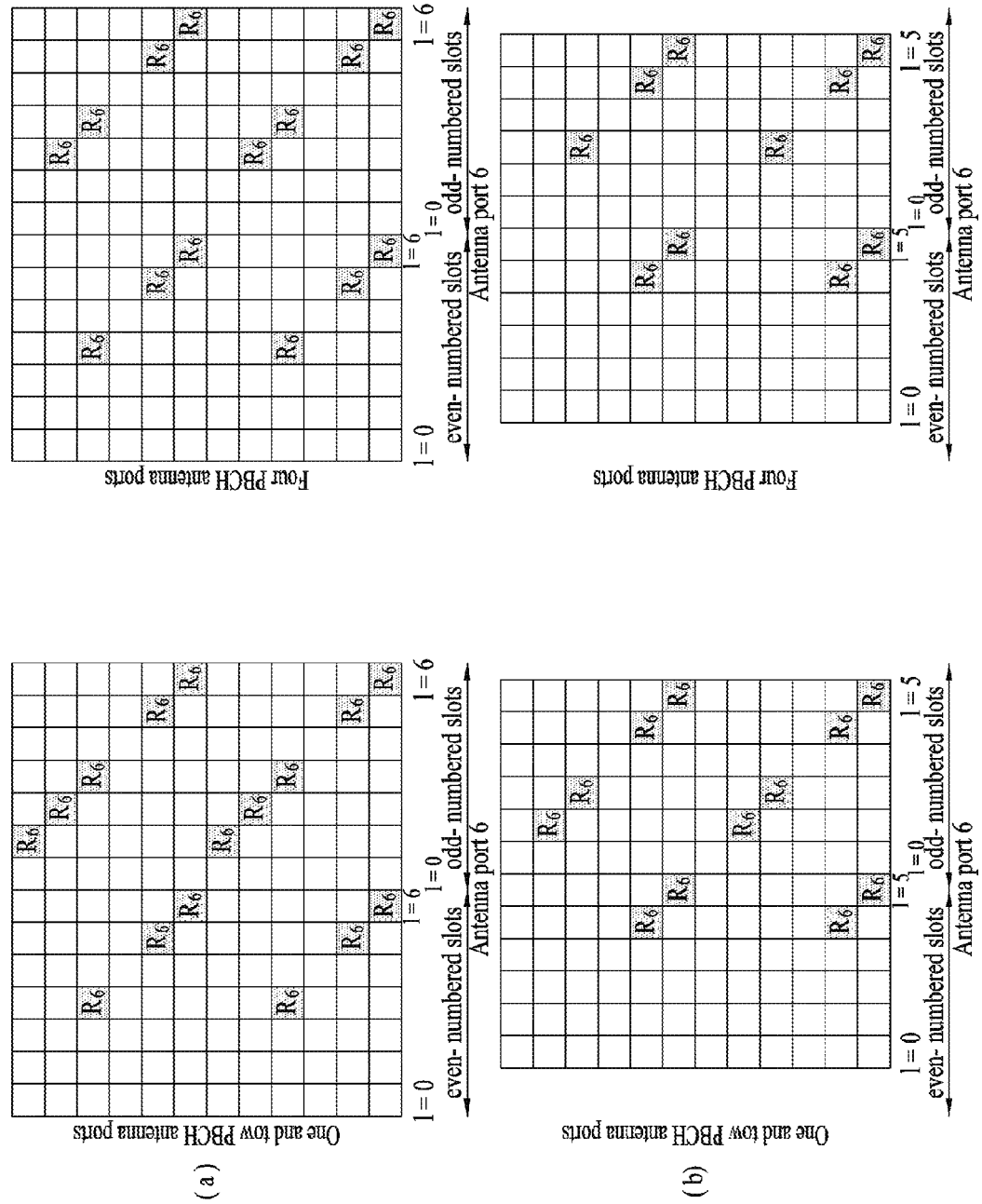
FIGS. 6 and 7 are diagrams for explaining a PRS.

As shown in FIG. 6, $T_{RSTD\ IntraFreqFDD,\ E\text{-}UTRAN}$ starts from a first subframe of a PRS positioning occasion closest in time after OTDOA-RequestLocationInformation and the OTDOA assistance data in OTDOA-ProvideAssistanceData are received in the physical layer of the UE.

If intra-frequency handover occurs while intra-frequency RSTD measurements are performed, the UE should complete an ongoing OTDOA measurement session. In addition, the UE should also meet the intra-frequency OTDOA measurement and accuracy requirements. In this case, $T_{RSTD\ IntraFreqFDD,\ E\text{-}UTRAN,\ HO}$ is given as shown in Equation 2.

Equation 2

$$T_{RSTD\ IntraFreqFDD,\ E\text{-}UTRAN,\ HO} = T_{RSTD\ IntraFreqFDD,\ E\text{-}UTRAN} + K \times T_{PRS} + T_{HO}\ ms \quad \text{[Equation 2]}$$

In Equation 2, K is the number of times of the intra-frequency handover occurs during $T_{RSTD\ IntraFreqFDD,\ E\text{-}UTRAN,\ HO}$. $T_{HO}$ is a time during which the intra-frequency RSTD measurement may not be possible due to the intra-frequency handover and it can be up to 45 ms.

Further, details of TDD intra-frequency OTDOA, FDD-FDD inter-frequency OTDOA, and TDD-FDD inter-frequency OTDOA could be found in 3GPP TS 36.133.

For the OTDOA, a BS may transmit, to the UE, the information on the reference cell and the information on the neighbor cells through OTDOA-ProvideAssistanceData as shown in Table 2 below.

TABLE 2

```
-- ASN1START
OTDOA-ProvideAssistanceData ::= SEQUENCE {
    otdoa-ReferenceCellInfo    OTDOA-ReferenceCellInfo       OPTIONAL,  -- Need ON
    otdoa-NeighbourCellInfo    OTDOA-NeighbourCellInfoList   OPTIONAL,  -- Need ON
    otdoa-Error                OTDOA-Error                   OPTIONAL,  -- Need ON
    ...
}
-- ASN1STOP
```

In Table 2, otdoa-ReferenceCellInfo is an information element (IE) used by a location server to provide reference cell information for the OTDOA assistance data and it can be defined as shown in Table 3 below.

TABLE 3

```
-- ASN1START
OTDOA-ReferenceCellInfo ::= SEQUENCE {
    physCellId        INTEGER (0..503),
    cellGlobalId      ECGI                    OPTIONAL,  -- Need ON
    earfcnRef         ARFCN-ValueEUTRA        OPTIONAL,  -- Cond
NotSameAsServ0
    antennaPortConfig ENUMERATED {ports1-or-2, ports4, . . .}
                                              OPTIONAL,  -- Cond
NotSameAeServ1
    cpLength          ENUMERATED { normal, extended, . . . ),
    prsInfo           PRS-Info                OPTIONAL,  -- Cond PRS
    . . .,
    [[ earfcnRef-v9a0 ARFCN-ValueENTRA-v9a0 OPTIONAL    -- Cond
NotSameAsServ2
    ]]
}
-- ASN1STOP
```

In Table 3, physCellId indicates a physical cell ID of the reference cell and cellGlobalId indicates a unique ID of the reference cell in the entire system. In addition, earfcnRef means EARFCN of the reference cell and antennaPortConfig represents which one of antenna ports 1, 2 and 4 is used for cell-specific reference signals. Moreover, cpLength indicates a CP length of a reference cell PRS and prsInfo indicates a PRS configuration of the reference cell.

Table 4 below shows a prsInfo IE.

TABLE 4

```
-- ASN1START
PRS-Info ::= SEQUENCE {
    prs-Bandwidth        ENUMERATED { n6, n15, n25, n50, n75, n100, . . . },
    prs-ConfigurationIndex INTEGER {0. .4095},
    numDL-Frames         ENUMERATED {sf-1, sf-2, sf-4, sf-6, . . .}
    . . .,
prs-MutingInfo-r9        CHOICE {
    po2-9                BIT STRING (SIZE(2)),
    po4-r9               BIT STRING (SIZE(4)),
    po8-r9               BIT STRING (SIZE(8)),
    po16-r9              BIT STRING (SIZE(16)),
    . . .
    }                                         OPTIONAL   -- Need OP
}
-- ASN1STOP
```

In Table 4, prs-Bandwidth indicates a bandwidth used to configure the PRS and ConfigurationIndex indicates a PRS configuration index, $I_{PRS}$. In addition, numDL-Frames indicates $N_{PRS}$, which is the number of consecutive downlink subframes with PRSs and prs-MutingInfo indicates a PRS muting configuration of a cell.

The information on the reference cell is used by the location server to inform the UE of the reference cell and neighbor cells, which are associated with a cell designated by the information on the reference cell, are informed through the information on the neighbor cells. The information on the neighbor cells provides a list sorted in descending order of priority for measurement, which needs to be performed by the UE. In this case, a first cell in the list has highest priority for measurement. In addition, the UE should perform and provide available measurements in the order provided by the location server.

Table 5 below shows a neighbor cell IE (i.e., OTDOA-NeighbourCellInfoList).

TABLE 5

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId              INTEGER (0..503),
    cellGlobalId            ECGI                OPTIONAL,   -- Need ON
    earfcn                  ARFCN-ValueEUTRA    OPTIONAL,   -- Cond NotSameAsRef0
    cpLength                ENUMERATED {normal, extended, ...}
                                                OPTIONAL,   -- Cond NotSameAsRef1
    prsInfo                 PRS-Info            OPTIONAL,   -- Cond NotSameAnRef2
    antennaPortConfig       ENUMERATED {ports-1-or-2, ports-4, ...}
                                                OPTIONAL,   -- Cond NotsameAsRef3
```

TABLE 5-continued

```
    slotNumberOffset         INTEGER (0..19)          OPTIONAL,    -- Cond NotSameAsRef4
    prs-SubframeOffset       INTEGER (0..1279)        OPTIONAL,    -- Cond InterFreq
    expectedRSTD             INTEGER (0..16383),
    expectedRSTD-Uncertainty INTEGER (0..1023),
    ...,
    [[ earfcn-v9a0           ARFCN-ValueEUTRA-v9a0    OPTIONAL     -- Cond NotSameAsRef5
    ]]
}
maxFreqLayers    INTEGER ::= 3
-- ASN1STOP
```

In Table 5, physCellId indicates a physical cell ID of the neighbor cell and cellGlobalId indicates a unique ID of the neighbor cell in the entire system. In addition, earfcnRef means EARFCN of the neighbor cell, cpLength indicates a CP length of a neighbor cell PRS, and prsInfo indicates a PRS configuration of the neighbor cell. Moreover, antennaPortConfig represents which one of the antenna ports 1, 2 and 4 is used for cell-specific reference signals. Furthermore, slotNumberOffset indicates a slot number offset between the neighbor cell and the reference cell and prs-SubframeOffset indicates an offset between a first PRSsubframe in the reference cell on a reference carrier frequency layer and a first PRS subframe in a different cell on a different carrier frequency layer. Further, expectedRSTD indicates an RSTD value which is measured by a target device between the neighbor cell and the reference cell and expectedRSTD-Uncertainty indicates uncertainty in an expectedRSTD value.

After receiving the information on the reference cell and the information on the neighbor cells as described above, the UE reports a reference signal time difference (RSTD), a RSTD quality, a reference quality, etc. to the BS. The RSTD means a relative time difference between a neighbor cell j and a reference cell i and it is defined as a difference between a time at which the UE receives a start point of a subframe from the neighbor cell j (i.e., TsubfrmaeRxj) and a time at which the UE receives a start point of a subframe closet to the corresponding subframe from the reference cell i (i.e., TsubframeRxi).

Table 6 below shows an OTDOA signal measurement information IE (i.e., OTDOA-SignalMeasurementInformation), which the UE reports to the BS.

TABLE 6

```
--ASN1START
OTDOA-SignalMeasurementInfomation ::= SEQUENCE {
    systemFrameNumber      BIT STRING (SIZE (10)),
    physCellIdRef          INTEGER (0..503),
    cellGlobalIdRef        ECGI                     OPTIONAL,
    earfcnRef              ARFCN-ValueEUTRA         OPTIONAL,    -- Cond NotSameAsRef0
    referenceQuality       OTDOA-MeasQuality        OPTIONAL,
    neighbourMeasurementList    NeighbourMeasurementList,
    ...,
    [[ earfcn.Ref-v9a0     ARFCN-ValneEUTRA-v9a0    OPTIONAL     -- Cond NotSameAsRef1
    ]]
}
NeighbourMeasurementList ::= SEQUENCE (SIZE(1..24)) OF NeighbourMeasurementElement
NeighbourMeasurementElement ::= SEQUENCE {
    physCellIdNeighbor     INTEGER (0..503),
    cellGlobalIdNeighbour  ECGI                     OPTIONAL,
    earfcnNeighbour        ARFCN-ValueEUTRA         OPTIONAL,    -- Cond NotSameAsRef2
    rstd                   INTEGER (0..12711),
    rstd-Quality           OTDOA-MeasQuality,
    ...,
    [[ earfcnNeighbour-v9a0    ARFCN-ValueEUTRA-v9a0    OPTIONAL    -- Cond NotSameAsRef3
    ]]
}
-- ASN1STOP
```

In Table 6, systemFrameNumber is a number of a system frame where the last measurement is performed, physCellIdRef indicates a physical cell ID of the reference cell associated with provision of RSTDs, and cellGlobalIdRef indicates a unique ID (ECGI) of the reference cell associated with provision of RSTDs. In addition, earfcnRef is an E-UTRA carrier frequency of the reference cell for the RSTD measurement and referenceQuality indicates a best estimate of the quality of measurement for time of arrival of a signal from the reference cell, which is used to calculate RSTD values. Moreover, neighborMeasurementList means a list containing the measured RSTD values together with a quality of each measurement. Furthermore, physCellIdNeighbor indicates physical cell IDs of the neighbor cells for which the RSTDs are provided and cellGlobalIdNeighbor indicates unique IDs of the neighbor cells for which the RSTDs are provided. Further, earfcnNeighbor indicates E-UTRA carrier frequencies of the neighbor cells for the RSTD measurements, rstd indicates a relative time difference between the reference cell and the neighbor cell, and rstd-Quality indicates a UE's best estimate of the measured RSTD quality.

For the above-described measurement in the OTDOA, the PRS can be used. Details of the PRS will be described hereinafter.

PRS (Positioning Reference Signal)

The PRS means a reference signal used for measuring a position of a UE and it is transmitted only in resource blocks in downlink subframes configured for PRS transmission. A downlink subframe in which the PRS is transmitted is defined as a positioning subframe. If both a normal subframe and an MBSFN (multicast-broadcast single frequency network) subframe are configured as positioning subframes within a cell, OFDM symbols in the MBSFN subframe may use the same cyclic prefix (CP) as used in subframe #0. On the other hand, If only MBSFN subframes are configured as positioning subframes within a cell, OFDM symbols configured for the PRS transmission in the MBSFN subframes may use an extended CP. In a subframe configured for the PRS transmission, starting positions of the OFDM symbols configured for the PRS transmission are identical to those in a subframe in which all OFDM symbols have the same cyclic prefix length as the OFDM symbols configured for the PRS transmission. In this case, the PRS is transmitted on antenna port 6. Moreover, the PRS is not mapped to resource elements to which a PBCH, a primary synchronization signal (PSS), a secondary synchronization signal (SSS), etc. are allocated.

A sequence for the PRS is defined according to Equation 3 below.

Equation 3

$$r_{l,n_s}(m) = \frac{1}{\sqrt{2}}(1 - 2 \cdot c(2m)) + j\frac{1}{\sqrt{2}}(1 - 2 \cdot c(2m + 1)),$$ [Equation 3]

$$m = 0, 1, \ldots, 2N_{RB}^{max,DL} - 1$$

In Equation 3, $n_s$ denotes a slot number, l denotes an OFDM symbol number in a slot, and c(i) is a pseudo-random sequence, which is initialized according to Equation 4 below.

Equation 4

$$c_{init} =$$ [Equation 4]
$$2^{10} \cdot (7 \cdot (n_s + 1) + l + 1) \cdot (2 \cdot N_{ID}^{cell} + 1) + 2 \cdot N_{ID}^{cell} + N_{CP},$$

$$N_{CP} = \begin{cases} 1 & \text{for normal } CP \\ 0 & \text{for extended } CP \end{cases}$$

As illustrated in FIG. 6, $r_{l,n_s}(m)$, which is generated based on Equation 3, is mapped to a complex-valued modulation symbol $a_{k,l}^{(p)} = r_{l,n_s}(m')$ used as a reference signal for the antenna port 6 in slot $n_s$ according to Equation 5.

Equation 5 for normal CP, [Equation 5]
$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

for extended CP,
$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ PBCH antenna ports}) \\ 2, 4, 5 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}.$$

The cell-specific subframe configuration period, $T_{PRS}$ and the cell-specific subframe offset, $\Delta_{PRS}$ for the PRS transmission can be determined as shown in Table 7 below depending on the PRS configuration index, $I_{PRS}$, which is transmitted through a higher layer signal.

TABLE 7

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | |

The PRS is not transmitted in special subframes but is transmitted only in downlink subframes. In addition, the PRS may be transmitted in $N_{PRS}$ consecutive downlink subframes (i.e., PRS positioning occasions) and the number $N_{PRS}$ is configured through a higher layer signal. The first subframe of the $N_{PRS}$ consecutive downlink subframes can satisfy Equation 6 below.

Equation 6

$$(10 \times n_f + \lfloor n_s/2 \rfloor - \Delta_{PRS}) \bmod T_{PRS} = 0$$

Figure 7:
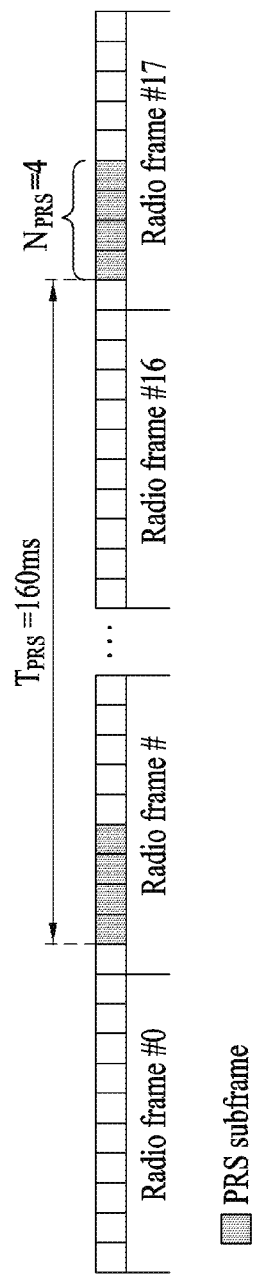

FIG. 7 illustrates an example of the above-mentioned subframe where the PRS is transmitted. In the example of FIG. 7, the PRS positioning occasion, $N_{PRS}$ is 4 and $T_{PRS}$ is 160.

Recently, higher accuracy has been required in an evolved positioning scheme such as an in-building positioning scheme. Even though the conventional positioning schemes can be commonly applied to both outdoor and indoor environments, typical positioning accuracy is estimated as, for example, in the case of the E-CID scheme, 150 m in an NLOS environment and 50 m in a LOS environment. In addition, the OTDOA scheme based on the PRS has a limitation in that positioning error may exceed 100 ms due to eNB synchronization error, multipath propagation error, UE's RSTD measurement quantization error, timing offset estimation error, etc. Moreover, in the case of the A-GNSS scheme, since a GNSS receiver is required, it has a limitation in that implementation complexity and battery consumption is increased. Further, the A-GNSS scheme is difficult to be applied to in-building positioning.

In the embodiments of the present invention, a measurement and position determination method capable of reducing a margin of error will be described. Specifically, according to the method, if a specific BS has multiple transmit antennas or allocates a plurality of RSs used for positioning in time and/or frequency domains and/or a spatial (antenna or beamforming) domain and a UE receives the plurality of the RSs, timing accuracy from the specific BS can be improved. In other words, the method relates a method for improving accuracy by obtaining time, frequency and/or spatial diversity when estimating time of arrival from a specific BS.

Embodiment 1

The first embodiment relates to a method for improving accuracy in estimating a UE's position through transmission and measurement of a PRS to which at least two precodings are applied. In the following description, the aforementioned OTDOA scheme is equally applied unless specified otherwise.

According to the embodiment of the present invention, a BS may transmit, to a UE, the PRS through a positioning reference signal (PRS) positioning occasion to which the at least two precodings are applied. In this case, each PRS positioning occasion includes two or more consecutive subframes and one of the at least two precodings may be applied to each of the two or more consecutive subframes. For example, if a PRS positioning occasion is composed of four subframes and if two precodings are used, a first precoding may be applied to first and third subframes (i.e., a first subframe group) and a second precoding may be applied to second and fourth subframes (i.e., a second subframe group). Alternatively, a different precoding may be applied per PRS positioning occasion. In the case of PRSs using different precodings, whether RSTDs are averaged or separate feedback is performed may be signaled from a network to the UE through a physical layer or higher layer signal. Alternatively, after performing RSTD estimation with respect to the different PRS precodings, the UE may determine whether to feedback the average RSTD value or individual RSTD values. Thereafter, the UE may signal, to the network or a location server, which operation is used by the UE.

In this case, each of the at least two precodings may form different vertical beams with respect to the UE. Although details will be described later, the UE may report a high-quality measurement value among the at least two precodings. Alternatively, although the UE reports all measurement results for the at least two precodings, the UE may also report which measurement result is obtained from which precoding (subframe). In this case, the BS may estimate which vertical beam is used by the corresponding UE.

The UE performs measurements for reference and neighbor cells based on the received PRS and then calculates RSTD and the like. Thereafter, the UE may transmit OTDOA signal measurement information (i.e., OTDOA-SignalMeasurementInfor) containing the above measurement and calculation results to the BS. In this case, the OTDOA signal measurement information may contain only a measurement value associated with a precoding with a high measurement quality among the at least two precodings. Alternatively, the OTDOA signal measurement information may include a reference signal time difference (RSTD) measurement associated with the precoding with the high measurement quality. The UE does not calculate an average of measurement results in subframes to which different precodings among the at least two precodings are applied. In other words, the average of the measurement results with respect to the different precodings is not valid. Specifically, the UE does not calculates an average with respect to TDOA estimates.

The BS can determine the UE's position based on the OTDOA signal measurement information received from the UE. In this case, the BS may be in a situation where a plurality of PRSs are configured for a specific cell and the corresponding cell has multiple transmit antennas.

The above description may be interpreted as that an additional PRS is transmitted together with an existing PRS. For convenience of description, the existing PRS is referred to as a legacy PRS and the additional PRS is referred to as a new PRS. In the following description, various embodiments regarding allocation of the new PRS and a relationship between the new PRS and the legacy PRS will be explained. According to a configuration of the new PRS, the new PRS may have more PRS occasions than the legacy PRS. However, the invention is not limited thereto.

Embodiment 2

The BS may configure a new RS in a different time and/or frequency region of a specific cell. By doing so, the UE can detect two types of RSs. This method can be applied when the BS uses a single antenna.

Although the new PRS may be implemented to have a configuration different from that of the legacy PRS, the new PRS may be configured by defining a new PRS port or using an existing RS.

For the new PRS, a new configuration thereof may be additionally signaled together with the existing configuration of the legacy PRS. Some or all of a subframe period in which the PRS is transmitted, a subframe offset, a location of frequency resources for transmitting the PRS, and a muting pattern, which are included in the additional PRS configuration, may be different from those of the existing legacy PRS configuration. In this case, the number of newly configured PRS configurations may be determined in advance or signaled through a physical layer or higher layer signal.

Embodiment 2-1

As a particular example, it is possible to allocate a PRS with a different period and/or offset in the time domain. In this case, a new PRS configuration may have the same PRS period as that of the legacy PRS configuration. However, an offset in the new PRS configuration may be different from that of the legacy PRS configuration. In this case, it is possible to reduce overhead caused by transmission of the new PRs configuration. Alternatively, only a period of the new PRS may be different from that of the legacy PRS. That is, if the new PRS configuration has a configuration different from that of the legacy PRS configuration, the UE may perform RSTD measurements at different periods. However, in this case, the new PRS and the legacy PRS may should be transmitted in the same subframe. In addition, since legacy UEs may not detect presence of the new RPS, the new PRS may be configured not to be transmitted at all times. As another method, i) simultaneous transmission may be allowed, ii) simultaneous transmission may be performed when different frequency resources (RBs) are used, or iii) simultaneous transmission may be performed when locations of REs are different from each other even though the same RB is used. When the new PRS and the legacy PRS are simultaneously configured in the same RB and RE, the new PRS may not be transmitted. A case in which the new PRS and the legacy PRS have the same scrambling sequence may not be a problem in that the same sequence is transmitted in the same RE. In this case, it can be assumed that the two PRSs are transmitted or the new PRS is not transmitted.

Embodiment 2-2

As another example, it is possible to allocate a new additional PRS in the frequency domain. That is, the new PRS may be allocated in a frequency region different from that in which the legacy PRS is allocated. For instance, if 10 MHz is allocated for the legacy PRS in the system having a system bandwidth of 20 MHz, 50 RBs with reference to the center frequency are used as a PRS transmission band according to the existing PRS configuration. In this case, the remaining 10 MHz, which is not used by the existing PRS, may be allocated for the new PRS (i.e., the new PRS may be configured in the remaining region except the 50 RBs with reference to the center frequency). Generally, the new PRS may be allocated to frequency RBs that are not used in the existing PRS configuration. In this case, the RBs used in the new PRS configuration may be signaled to the UE through a higher layer signal by expressing the used RBs in the form of a bitmap. If consecutive RBs are allocated as the frequency region, indices of RBs located at start and end points may be signaled. In this case, to obtain not only frequency diversity but also energy gain, the new PRS may be configured to be transmitted in a subframe different from that used for transmitting the legacy PRS. Alternatively, to reduce the number of signaling bits, the new PRS may have the same period as that of the legacy PRS or a period different from that of the legacy PRS.

In addition, frequency hopping can be applied to the new PRS configuration. A network may determine whether the frequency hopping is applied. For instance, whether the PRS is frequency hopped is signaled through a higher layer signal. That is, when a plurality of subframes are configured for PRS transmission and the PRS is configured to be transmitted in some RBs in each of the subframes, it may be determined (in advance) that certain RBs positioned at locations where the frequency RBs have been previously transmitted are shifted in each subframe and then transmission is performed on the RBs. In this case, the number of the shifted RBs may be predetermined or determined by the network through a higher layer signal. To accurately estimate a reception timing of the PRS, it is preferred to transmit the RPS over the full bandwidth. However, in this case, since all RBs are used to transmit RSs, a data coding rate may be degraded. To prevent this problem, the PRS may be configured to be transmitted in a partial frequency region. In this case, if the PRS is transmitted by hopping in the frequency region rather than in a fixed frequency position, it is possible to obtain the frequency diversity, whereby performance gain is also increased.

Meanwhile, when the frequency hopping is applied to the frequency domain and the new PRS is transmitted in the same subframe as the existing PRS, a rule may be defined such that i) the frequency region where the new PRS is frequency hopped is configured except the region where the legacy PRS is transmitted, ii) the new PRS is not transmitted at all times when the new PRS and the legacy PRS are transmitted in the same subframe/RB, iii) the new PRS and the legacy PRS are transmitted together when different REs are used even though the two PRSs are transmitted in the same subframe/RB, or iv) the new PRS is not transmitted at all times when the new PRS and the legacy PRS are transmitted in the same subframe.

Such additional PRS configurations may be established for a specific cell (or a specific cell group) or all cells. For instance, additional PRSs may be configured only for a specific small cell/small cell group in an indoor environment to improve accuracy in the corresponding cell/cell group.

In the cell having additionally configured PRSs, a UE may estimate TDOA with respect to a plurality of PRS configurations. In this case, the UE may not calculate an average of TDOA measurement values in RS level with respect to different PRS configurations. In other words, the UE may calculate TDOA with respect to each of the PRS configurations and then consider the TDOA, which is obtained by performing a weighted sum operation on the different PRS configurations, as final TDOA. Alternatively, the UE may selectively feedback the best RSTD measurement quality per PRS configuration. Further, the UE may calculate an average of RSTDs measured for the individual PRS configurations and then feedback the RSTD average. In this case, the above-mentioned average operation may be limitedly applied only when a single eNB configures a plurality of different PRS configurations. Meanwhile, when a plurality of PRSs are transmitted in the same subframe in the frequency domain at the same period, the TDOA estimation may be performed by calculating an average of all PRSs exceptionally.

Embodiment 3

According to the embodiment 3, which is obtained by generalizing the embodiment 1, different precodings are applied to a plurality of PRSs. In particular, the embodiment 3 can be applied to when a plurality of PRSs are configured for a specific cell and the corresponding cell has multiple transmit antennas.

If the new PRS configuration is identical to the legacy configuration in the frequency domain but it is transmitted in a subframe different from that in which the legacy PRS configuration is transmitted in terms of the time domain, it is preferred to configure the precodings applied to PRS configurations to be orthogonal to each other in order to maximize diversity. For instance, if there are two APs, two orthogonal beams may be configured to be repeated. In addition, if there are four APs, four orthogonal beams may be configured to be repeated.

In this case, precoding granularity corresponding to a unit of resource where the same precoding is applied may be configured in advance or signaled to a UE through a higher layer signal. For instance, precoding granularity in the frequency domain may be configured to be dependent on a system bandwidth or a bandwidth in which the PRS is transmitted. For example, if ten RBs are configured as the PRS transmission bandwidth, different precodings are configured every single RB. If more than ten RBs are configured as the PRS transmission bandwidth, the precoding granularity may be configured as two RBs. If the number of different precodings in the frequency domain, which are configured to obtain sufficient diversity gain, is greater than a certain threshold, it may significantly increase channel estimation complexity. To prevent the channel estimation complexity from increasing, the same precoding is applied every predetermined number of PRBs. Such precoding granularity can be identically defined in the time domain. For instance, when new PRSs are configured in the time domain as described above, it can be assumed that different precodings are applied to different PRSs. Alternatively, in the case of a single PRS configuration, if PRSs are transmitted in a plurality of subframes in a PRS occasion, the number of subframes where the same precoding can be assumed may be determined in advance or signaled by a network. Alternatively, the number of subframes where the same precoding is assumed may be determined depending on the number of subframes in the PRS occasion. For instance, a rule may be predetermined such that as the number of subframes allocated for the PRS configuration increases, the number of subframes where the same precoding is assumed increases. This may be interpreted as that a PRB bundling size increases depending on a bandwidth in the frequency domain.

In the case of the PRSs to which the different precodings are applied, TDOA measurements may not be averaged. For instance, in the time domain, TDOA measurements for the PRSs having the different precodings applied thereto are performed separately. Thereafter, each of the TDOA measurements is separately reported to the network or location server. However, to obtain the diversity gain, the network may instruct a UE to average the PRSs having the different precodings applied thereto when performing the TDOA measurements for the different precoding.

When configuring the PRS, the network may indicate the UE whether it should give priority to diversity or each measurement. Alternatively, after measuring its SNR quality or RSTD measurement quality, the UE may select a proper mode and then inform the network (or location server) of the selected mode. In this case, if the UE separately performs the TDOA measurement for each precoding, the UE may separately feedback RSTD values for respective precodings. Alternatively, if the UE selects a diversity mode, the UE may feedback one RSTD value for different precodings.

For the above-described operation, the network/BS and the UE operate as follows.

When the network (or location server) allocates the PRS, the network informs the UE of a PRS period, a PRS occasion, a PRS resource location, etc. In this case, the network may configure different resources for the PRSs where the different precodings are applied. Alternatively, the network may inform the UE of information on a precoding granularity size for indicating the number of subframes in the PRS occasion where the same precoding is applied, information on whether the same precoding is configured, or information on the same precoding is configured in each precoding occasion. Alternatively, the network may transmit, to the UE, a signal indicating whether the UE should perform separate measurements for individual precodings or a one-time measurement for the individual precodings (i.e., which one of the separate measurements and the one-time measurement is advantageous). For instance, the network may instruct a UE capable of obtaining a sufficiently good SNR or measurement quality to perform the separate PRS measurements and a UE that is expected to obtain a poor SNR or measurement quality to perform the one-time measurement for the different precodings.

The UE performs one or several RSTD (TDOA) measurements on PRS resources configured by the network. For example, if the BS applies different precodings to each subframe/subframe group in the PRS occasion in the vertical direction, the UE may measure TDOA values for the different precodings and then report all TDOA values for the different precodings to the network. Alternatively, the UE may report, to the network, a TDOA value (RSTD value) with the highest measurement quality or SNR among the measured TDOA values.

When the UE reports the highest quality with respect to a specific vertical beam direction, the network can improve accuracy in estimating a UE's position. This is because since the UE is likely to be located along the corresponding beam direction, even though an OTDOA operation for calculating a final position of the UE has a plurality of solutions, the network can exclude specific solutions through the UE's measurement quality for each precoding.

Although the above procedure is described based on the case in which the different precodings are configured for respective PRS resources, it can be extended to a case in which locations of frequency resources are configured differently for the respective PRS resources or a case in which separate measurements need to be performed for PRSs configured for different time resources. For instance, if frequency diversity is applied to a specific PRS, the UE may separately perform RSTD measurements for individual frequency resources and then report an RSTD measurement with the highest quality among the RSTD measurements. Alternatively, the UE may report all RSTD measurements. When the UE reports all RSTD measurements, the network may select the measurement with the highest quality and then utilize it to estimate the UE's position. Alternatively, the network may transmit, to the UE, a signal indicating whether the UE needs to perform separate measurements for respective PRS resource locations or a one-time measurement for the respective PRS resource locations. Further, the UE may autonomously determine its measurement and then transmit, to the network, a signal indicating how the UE performs the measurement.

Meanwhile, when a plurality of PRSs are configured, the plurality of the PRSs may be simultaneously configured in a single subframe and/or in the same frequency RB region. In this case, it is preferred to transmit the plurality of the PRSs and the legacy PRSs in different REs. Thus, v shift in the new PRS configuration may be configured as shown in the following equation:

$$v_{shift} = (N_{ID}^{cell} + a) \bmod 6$$

In the above equation, 'a' which has a value in the range of 1 to 6 is configured in advance or signaled by the network. If the same RE as that used in the legacy PRS is used within one subframe, it may be preferred to use an RS sequence different from that used in the legacy PRS for the corresponding RE.

The proposed methods can be applied not only to the TDOA method but also to a radio frequency pattern matching (RFPM) method. For instance, if a measurement value associated with receive power is reported for each different PRS (e.g., for each different RB group), a base station side can utilize it for RFPM-based estimation.

Device Configuration According to Embodiments of the Present Invention

Figure 8:
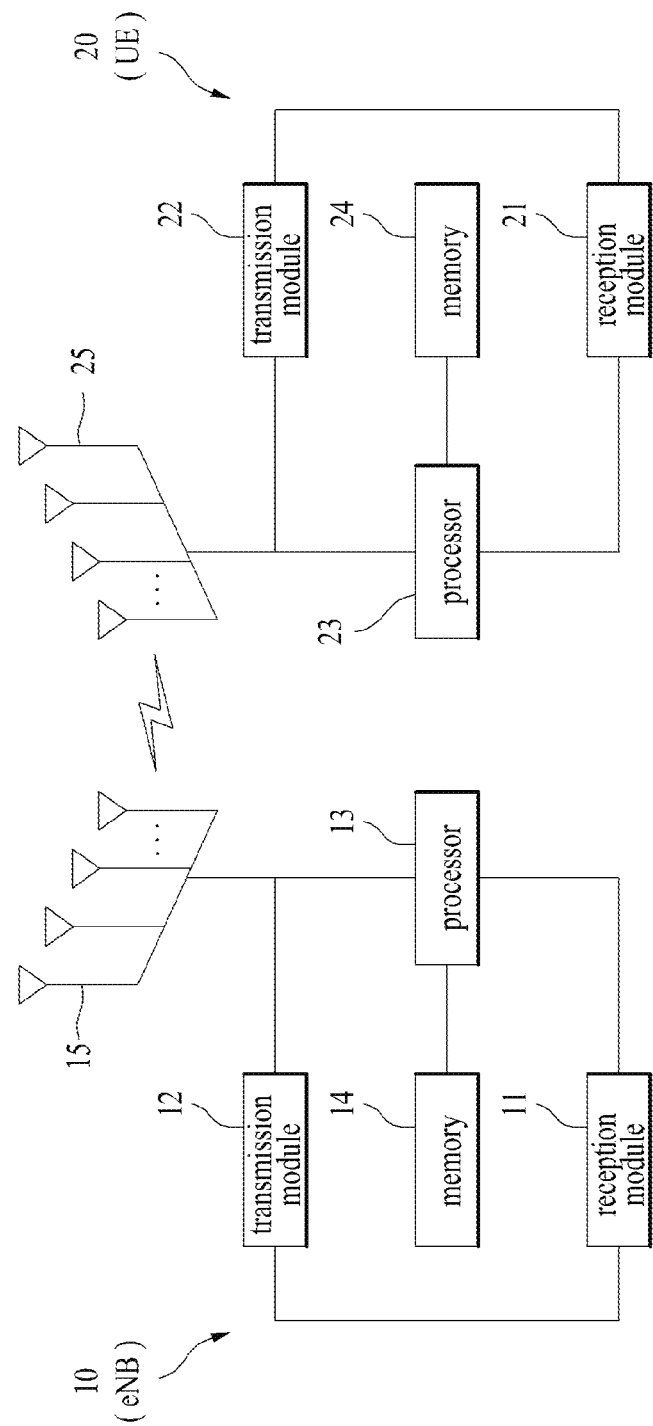
FIG. 8 is a block diagram illustrating configurations of transmitting and receiving devices.

FIG. 8 is a diagram illustrating configurations of a transmission point device and a user equipment device according to embodiments of the present invention.

Referring to FIG. 8, a transmission point device 10 according to the present invention may include a receiving device 11, a transmitting device 12, a processor 13, a memory 14 and a plurality of antennas 15. The plurality of the antennas 15 may mean that the transmission point device supports MIMO transmission and reception. The receiving device 11 can receive various signals, data and information in uplink from a user equipment. The transmitting device 12 can transmit various signals, data and information in downlink to the user equipment. In addition, the processor 13 can control overall operation of the transmission point device 10.

The processor 13 of the transmission point device 10 according to one embodiment of the present invention can handle the details required in each of the aforementioned embodiments.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 8, a UE device 20 according to the present invention may include a receiving device 21, a transmitting device 22, a processor 23, a memory 24 and a plurality of antennas 25. The plurality of the antennas 25 may mean that the UE device supports MIMO transmission and reception. The receiving device 21 can receive various signals, data and information in downlink from a BS. The transmitting device 22 can transmit various signals, data and information in uplink to the BS. In addition, the processor 23 can control overall operation of the UE device 20.

The processor 23 of the UE device 20 according to one embodiment of the present invention can handle the details required in each of the aforementioned embodiments.

The processor 23 of the UE device 20 performs functions of operating and processing information received by the UE device 20, information to be externally transmitted by the UE device 20, and the like. The memory 24 can store the operated and processed information and the like for a prescribed period and can be substituted with such a component as a buffer (not shown in the drawing) and the like.

The detailed configurations of the transmission point device 10 and the UE device 20 can be implemented such that the details explained with reference to various embodiments of the present invention are independently applied or two or more embodiments of the present invention are simultaneously applied. Here, redundant description shall be omitted for clarity.

The description of the transmission point device 10 in FIG. 8 may be equally applied to a relay node device as a downlink transmission entity or an uplink reception entity. And, the description of the UE device 20 in FIG. 8 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In the case of implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In the case of implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of performing operation related to an observed time difference of arrival (OTDOA) in a wireless communication system, the method performed by a base station and comprising:
   applying at least two precodings, for beamforming in a corresponding at least two different directions, to a Positioning Reference Signal (PRS) positioning occasion, the PRS positioning occasion including a plurality of positioning subframes;
   transmitting, to a user equipment, a positioning reference signal (PRS) through the PRS positioning occasion to which the at least two precodings are applied;
   receiving, from the user equipment,
      OTDOA signal measurement information that is based on the PRS, and
      information on a measurement quality associated with the precoding;
   estimating a direction in which the user equipment is located based on the information on the measurement quality;

determining a position of the user equipment based on the OTDOA signal measurement information and the estimated direction; and transmitting a signal related to a location-based service to the user equipment, wherein the location-based service is a service utilizing the determined position of the user equipment.

2. The method of claim 1, wherein the OTDOA signal measurement information is based on a reference signal time difference (RSTD) measurement.

3. The method of claim 1, wherein estimating the direction comprises:

beamforming in accordance with a precoding among the at least two precodings having a highest measurement quality.

4. The method of claim 1, wherein each of the at least two precodings forms different vertical beams for the user equipment.

5. The method of claim 1, wherein the plurality of positioning subframes comprises two or more consecutive positioning subframes, and wherein one of the at least two precodings is applied to each of the two or more consecutive positioning subframes.

6. The method of claim 5, wherein an average of measurement results in the two or more consecutive positioning subframes where different precodings among the at least two precodings are applied is not allowed.

7. A method of performing operation related to an observed time difference of arrival (OTDOA) in a wireless communication system, the method performed by a user equipment and comprising:

receiving a positioning reference signal (PRS) on a PRS positioning occasion to which at least two precodings for beamforming in a corresponding at least two different directions are applied;

transmitting, to a base station, an OTDOA signal measurement information that is based on the PRS, and information on the measurement quality associated with the precoding; and receiving a signal related to a location-based service from the base station, wherein the information on the measurement quality provides information to the base station for estimating a direction in which the user equipment is located, wherein the estimated position and the OTDOA signal measurement provides information to the base station for estimating a position of the user equipment, wherein the location-based service is a service utilizing a position of the user equipment, and wherein the position of the user equipment is determined by the base station based on the OTDOA signal measurement information and the information on the measurement quality.

8. The method of claim 7, wherein the OTDOA signal measurement information is based on a reference signal time difference (RSTD) measurement.

9. The method of claim 7, wherein the direction is estimated by the base station by beamforming in accordance with a precoding among the at least two precodings having a highest measurement quality.

10. The method of claim 7, wherein each of the at least two precodings forms different vertical beams for the user equipment.

11. The method of claim 7, wherein the plurality of positioning subframes comprises two or more consecutive positioning subframes, and wherein one of the at least two precodings is applied to each of the two or more consecutive positioning subframes.

12. The method of claim 11, wherein the user equipment does not calculate an average of measurement results in the two or more consecutive positioning subframes where different precodings among the at least two precodings are applied.

13. A user equipment configured to perform an operation related to an observed time difference of arrival (OTDOA) in a wireless communication system, the user equipment comprising:

an antenna;

a transceiver; and a processor operatively connected to the transceiver and configured to:

receive a positioning reference signal (PRS) on a PRS positioning occasion to which at least two precodings for beamforming in a corresponding at least two different directions are applied;

transmit, to a base station, an OTDOA signal measurement information that is based on the PRS and information on the measurement quality associated with the precoding; and receive a signal related to a location-based service from the base station, wherein the information on the measurement quality provides information to the base station for estimating a direction in which the user equipment is located, wherein the estimated position and the OTDOA signal measurement provides information to the base station for estimating a position of the user equipment, wherein the location-based service is a service utilizing a position of the user equipment, and wherein the position of the user equipment is determined by the base station based on the OTDOA signal measurement information and the information on the measurement quality.

* * * * *